United States Patent [19]

Irwin

[11] Patent Number: 4,798,318
[45] Date of Patent: Jan. 17, 1989

[54] CARRIER BAG ASSEMBLY FOR BICYCLE HANDLEBARS

[75] Inventor: David Irwin, Newtown, Conn.

[73] Assignee: Cannondale Corporation, Georgetown, Conn.

[21] Appl. No.: 915,813

[22] Filed: Oct. 6, 1986

[51] Int. Cl.⁴ .............................................. B62J 7/06
[52] U.S. Cl. ................................. 224/32 R; 224/36; 248/223.4; 280/289 A
[58] Field of Search ........... 224/30 R, 30 A, 31, 224/32 R, 33 A, 33 R, 35, 36, 39, 41; 280/289 A, 202, 289 H; 248/230, 224.4, 223.4, 222.1; 403/326, 331, 375, 380; 220/401, 403, 74

[56] References Cited

U.S. PATENT DOCUMENTS

| | | | |
|---|---|---|---|
| 3,322,313 | 5/1967 | Gondi | 224/32 R |
| 3,386,695 | 6/1968 | Blood et al. | 248/222.1 |
| 3,396,885 | 8/1968 | Gondi | 224/32 R |
| 3,515,322 | 6/1970 | Schneider | 224/32 R |
| 3,848,843 | 11/1974 | Levy | 248/223.4 |
| 3,870,188 | 3/1975 | Buffett | 220/74 |
| 4,056,219 | 11/1977 | Hine, Jr. | 224/36 |
| 4,066,196 | 1/1978 | Jackson et al. | 224/30 A |
| 4,271,996 | 6/1982 | Montgomery | 224/32 |
| 4,313,548 | 2/1982 | Edelson | 224/36 |
| 4,376,502 | 3/1983 | Cohen | 224/32 R X |
| 4,438,764 | 3/1984 | Eppolito | 224/210 |
| 4,542,839 | 9/1985 | Levine et al. | 224/36 |

Primary Examiner—Henry J. Recla
Assistant Examiner—Ernest G. Cusick
Attorney, Agent, or Firm—Brumbaugh, Graves, Donohue & Raymond

[57] ABSTRACT

A bicycle handlebar carrier bag comprises a bracket adapted to be fastened immovably to the bicycle handlebars, a bag of durable flexible material, and a substantially rigid unitary three-dimensional frame received within the bag and having a back portion with a perimeter coextensive with the perimeter of the back wall of the bag and side portions with perimeters coextensive with the perimeters of the side walls of the bag. An attachment member affixed to the back portion of the frame is releasably received by the bracket.

14 Claims, 2 Drawing Sheets

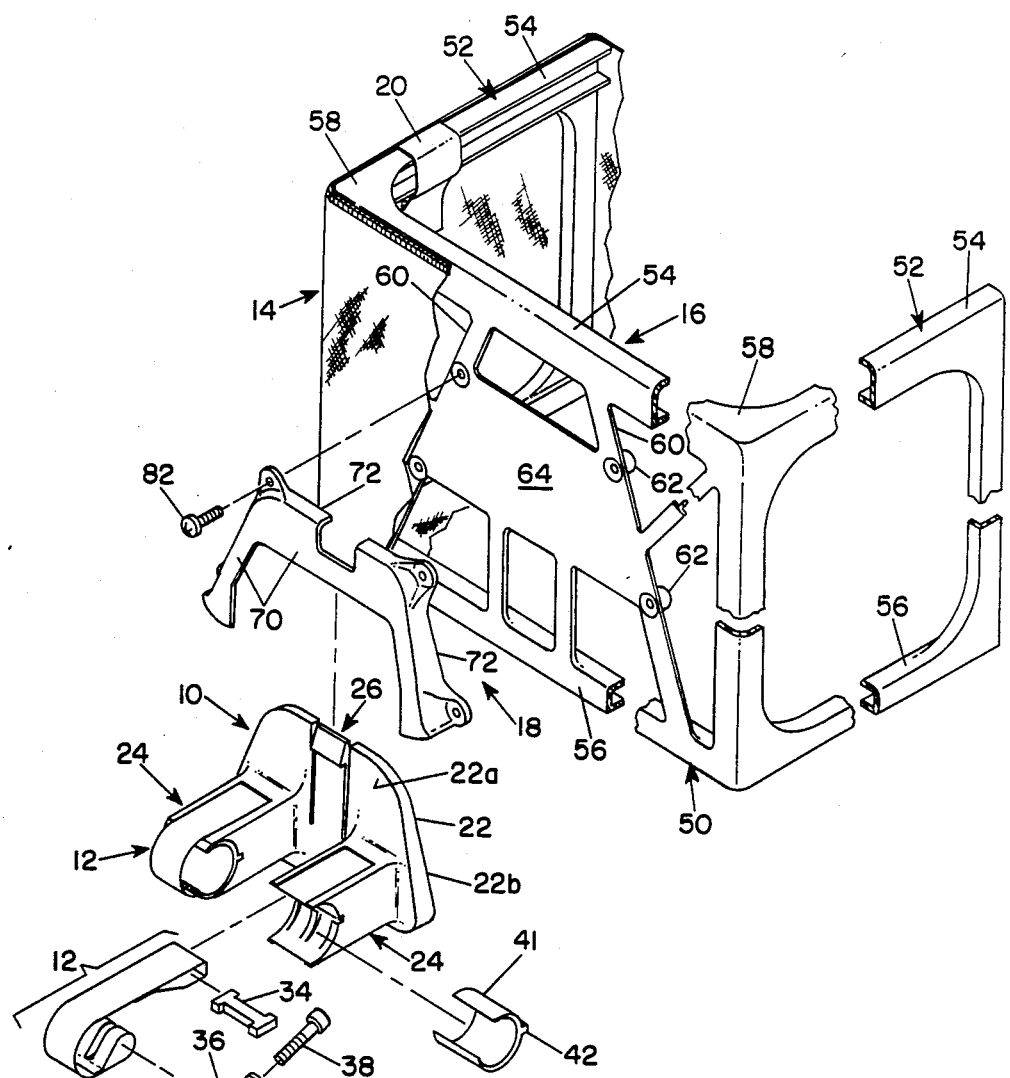
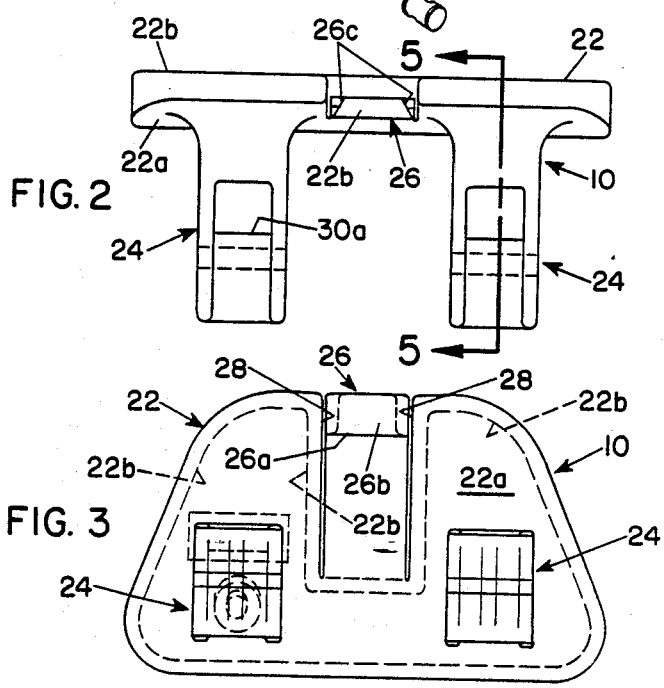
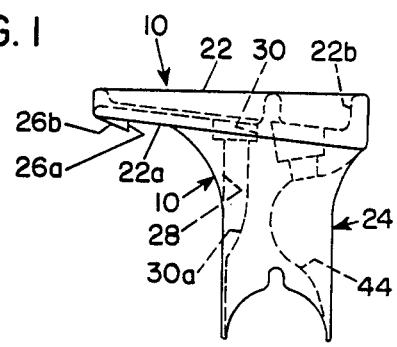

CARRIER BAG ASSEMBLY FOR BICYCLE HANDLEBARS

BACKGROUND OF THE INVENTION

In recent years bicycling has become a very popular recreational and physical-conditioning activity. Many recreational bicycle riders equip their bicycles with one or more carrier bags to carry clothing, food, camera equipment, first aid kits, tools and other articles that they may need or wish to use in the course of a ride. A particularly popular type of bicycle carrier bag is a handlebar bag, and numerous designs for bicycle handlebar bags have been proposed and commercialized over the years.

Experienced bicycle riders know that one of the most important attributes of a bicycle carrier bag, including handlebar bags, is the ability to resist motion relative to the bicycle, particularly side-to-side motion. Side sway of a handlebar bag significantly increases the amount of effort required to steer the bicycle, particularly when the rider is peddling hard, and also increases the effort required to maintain balance because of the increased lateral acceleration caused by the shifting load.

There have been various proposals for stabilizing bicycle handlebar bags. One example is found in U.S. Pat. No. 4,066,196 (Jan. 3, 1978), which describes and shows a handlebar bag supported from the top by a bent wire carrier that hooks under the stem and over the handlebars and has spaced-apart forwardly extending arms received in sleeves at the upper edges of each of the bag side walls. The wire carrier provides reasonably good stability for the upper part of the bag. In an effort to stabilize the lower part of the bag against side sway, elastic cords are connected to each side of the bottom of the bag and extend down to lower attachment points close to the wheel dropouts of the front fork. The elastic cords impart a degree of stability to the lower part of the bag, but because they are inherently elastic, they merely reduce but do not eliminate side sway of the lower part of the bag.

In a relatively recent design for a handlebar carrier bag found in U.S. Pat. No. 4,542,839 (Sept. 24, 1985), a flexible fabric bag is partially stabilized as to shape and load-carrying ability by a substantially rigid plate that is co-extensive with the back wall of the bag and by a U-shaped rod member hinged in an inverted position to the lower edge of the back plate and positioned with its legs extending diagonally along the side walls to locate the base of the U along the upper edge of the front wall of the bag. U.S. Pat. No. 4,542,839 further proposes a bent wire carrier member that hooks under the stem and over the handlebars very much like the arrangement of U.S. Pat. No. 4,066,196. A mounting assembly comprising one component attached to the back plate of the bag and another component attached to or part of the wire carrier affixes the bag on the handlebars. One element of the attachment system is an elastic cord for inhibiting vertical motion of the wire carrier.

The carrier bag and mounting system of the '839 patent provides reasonably good support for the upper part of the bag by virtue of stabilization of the upper edges of the front and rear walls. In addition, the lower edge of the rear wall of the bag is stabilized by the back plate. Nonetheless, a large part of the lower portion of the bag is not restrained against lateral movement. Inasmuch as the lower part of a bicycle carrier bag is often loaded with the heaviest articles, there is a particular need for stabilization of the lower portion of the bag against side sway, a need that is not fulfilled by the designs of either the '196 or '839 patents.

It is known from U.S. Pat. No. 4,271,996 (June 9, 1981), which is assigned to Cannondale Corporation, the assignee of the present invention, as well as the successful commercialization of the invention of that patent, to stabilize a flexible bicycle bag by means of a substantially rigid three-dimensional frame comprising a back portion and a top portion and side members joined between the top portion and the back portion in the upper part of each side of the bag to stiffen and shape the upper part of the bag so that loads carried in the bag are supported from the top and the bag is prevented from sagging. If one were to consider the three-dimensional frame of the '996 patent for use on a handlebar bag, the result would be much the same as the result of the designs in the '839 and '196 patents, namely good support for and stabilization in the upper portion of the bag but little stabilization against side-sway in the lower part of the bag.

SUMMARY OF THE INVENTION

There is provided, in accordance with the present invention, a handlebar carrier bag assembly for bicycles comprising a bracket having a generally vertical plate portion and a pair of generally horizontal support arms extending from the back of the plate portion. Suitable clamp devices, such as band clamps, are used to fasten the ends of the legs of the bracket immovably to the bicycle handlebars. A flexible bag that opens at the top receives a substantially rigid unitary three-dimensional frame. The frame includes a back portion having a perimeter substantially co-extensive with the back wall of the bag and side portions having perimeters substantially co-extensive with respective side walls of the bag. A substantially rigid attachment sleeve is affixed to the back portion of the frame externally of the bag and defines with part of the frame back portion a downwardly open cavity that receives from below in close-fitting relation the plate portion of the bracket so that the frame is substantially immovably supported against downward and lateral movement on the bicycle handlebars.

Preferred embodiments of the invention may include one or more of the following further characteristics.

1. The plate portion of the bracket may have side edges that diverge downwardly, thus to facilitate mounting the bag on the bracket.

2. The plate portion of the bracket may have front and back surfaces that diverge downwardly relative to each other, and the attachment sleeve may be shaped for conformity with the perimeter of the back surface of the plate portion. In this arrangement the cavity is upwardly tapered, and it is easier, therefore, to mount the bag on the bracket.

3. Preferably, a suitable device is provided for releasably affixing the attachment sleeve to the bracket against upward movement. One arrangement includes a latch member on the bracket having a downwardly facing latch shoulder and an upwardly facing abutment surface on the attachment sleeve engageable by the latch shoulder when the sleeve is positioned on the bracket. The latch member is biased for engagement of the shoulder with the abutment and manually movable against the bias for release. Preferably, the latch member is an integral part of a plate portion of the bracket defined by generally vertical, laterally spaced-apart elongated slots in the plate portion defining a leaf having a free upper end, the shoulder being on the back of the leaf near the upper end. In this arrangement it is desirable that the upper end of the leaf be substantially contiguous with the upper edge of the plate portion so that it does not project and is not subject to an impact that can break it.

4. In an exemplary embodiment the cavity defined by the attachment sleeve is of inverted U-shape and has an opening in the back through which the support arms of the bracket protrude when the bag is mounted on the bracket.

5. For light weight and minimum use of material the frame may be molded from a polymeric material and be constituted by a network of interconnected rib members. In an exemplary embodiment the rib members include an upper rib member and a lower rib member, each of generally U-shape in plan and constituting the upper and lower perimeters of the back and side walls of the fabric bag. The back and side portions of the upper and lower rib members are, preferably, joined by gussets for enhanced rigidity against deflection of the side portions of the frame. Furthermore, the back portion of the frame may include back rib members coincident with four mutually-spaced apart portions of the attachment sleeve, and the sleeve is attached to the back rib members at said portions.

6. A preferred arrangement for attaching the bracket to bicycle handlebars consists of a metal band associated with each bracket arm and tensioned in a loop around the handlebar to draw the end of each arm into frictional engagement with the handlebar. Preferably, one end of each band passes through the plate portion of the bracket and is affixed thereto against movement toward the free end of the arm, the other end of each arm receives a nut, and a screw passes through the plate portion from the front and is threaded into the nut so that the nuts are conveniently accessible for tightening from in front of the plate portion. In this arrangement, moreover, metal components form loops that start from the front of the bracket plate portion, pass around the handlebars and return to the front of the bracket plate portion, thereby enhancing the strength of the bracket arms and loading them manually in compression.

One important attribute of the present invention is the restraining effect of the internal frame in imparting shape to the bag, distributing the load of the contents of the bag to the upper edges of the side and back walls of the bag, and stabilizing both side walls of the bag throughout their entire extents from lateral movement. Furthermore, inasmuch as the bottom, front and top walls of the bag extend laterally between the perimeters of the side portions of the internal frame, both side portions of the internal frame share sideways loads imparted by articles carried in the bag in either direction. For example, if the articles in the bag tend to push against the left wall of the bag and tend to deflect the left side portion of the internal frame, deflection of the left side portion is inhibited not only by the rigidity of the left side portion but by the transmission of loads through the top, front and bottom walls of the bag to the right side portion of the frame. By contrast, in the handlebar bag of the '196 patent referred above, a side load imposed on one of the elastic cords tending to elongate it is actually increased by the lateral force component imposed by the other elastic cord.

A further advantage of the present invention is the substantially complete immobility of the bag relative to the bicycle handle bars afforded by the immovable attachment of the bag to the handlebars without any elastic element involved. Moreover, the means of attachment allows the bag to be readily and easily detached from the bracket and installed on the bracket.

For better understanding the invention, as well as of various other characteristics and advantages thereof, reference may be made to the following description of an exemplary embodiment, taken in conjunction with the figures of the accompanying drawings.

BRIEF DESCRIPTION OF THE DRAWINGS

FIG. 1 is an exploded pictorial view of the embodiment, portions of the internal frame being broken away in cross section for clearer illustration and most of the fabric bag being omitted for clarity;

FIGS. 2, 3 and 4 are top plan, rear elevational, and right side elevational views of the bracket component of the embodiment, respectively;

DESCRIPTION OF THE PREFERRED EMBODIMENT

Figure 5:
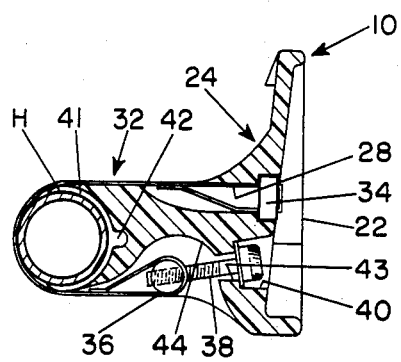
FIG. 5 is a right side cross-sectional view of a bracket component, as assembled onto a handlebar by a band clamp, the view being taken along the lines 5—5 of FIG. 2.

Referring first to FIG. 1, the embodiment comprises a bracket 10 affixed, such as by a band clamp assembly 12, to the handlebars, a bag of light-weight flexible material such as fabric and designated by the reference numeral 14, a three dimensional frame 16 mounted inside the fabric bag and an attachment sleeve 18 attached to the back wall of the frame 16 on the outside of the fabric bag 14.

In the following description and the drawings, the details of the fabric bag 14 are omitted, inasmuch as the construction of such bags is well known. It suffices to say that the fabric bag 14 comprises a back wall, a front wall, side walls, bottom wall, all of which are joined to produce a substantially rectilinear compartment open at the top. A top wall of the bag is joined to the upper edge of the front, back or side walls, attachment to the upper edge of the front wall being preferred for convenience of use. A zipper or equivalent releasable fastener is provided to fully close the bag along the remaining free edges of the top. Additional compartments can be built into the top wall and front wall of the bag, as can side pockets, such as elastic netting side pockets. The tops of the bags are frequently fitted out to receive a detachable map case. A carrying handle and provisions for a shoulder strap are desirable. The particular design and construction of a fabric bag for the present of invention is a matter of choice and is well within the ordinary skill of the art. It is suitable at this point to mention, however, that a hook and loop cloth band 20 is provided near the rear of the upper edge of each side wall of the bag to support the side walls of the bag against slipping down when the zipper is open. The upper edge of the front wall of the bag is adequately supported at the stitched juncture between the top wall and the front wall. Likewise, the rear wall of the bag is adequately supported on the frame, inasmuch as the attachment sleeve 18 is attached to the frames 16 by fasteners that pass through the back wall of the fabric bag 14.

Referring next to FIGS. 2-5 the bracket 10 is molded from a suitable plastic and includes a generally vertically oriented plate portion 22 and a pair of laterally-spaced apart mounting arms 24 extending rearwardly from the back face of the plate portion 22. From viewing FIGS. 1 and 3 together, it may be seen that the plate portion 22 comprises a wall portion 22a that is of generally "U" Shape in rear and front elevation and is bounded by a rib 22b that is of progressively greater depth (in lateral aspects) moving from top to bottom (see FIG. 4). The free forward edge of the rib 22b lies in a plane that forms a relatively small acute angle with the rear surface of the wall portion 22a, thereby making the plate portion 22 of the bracket generally wedge-shaped in lateral profile (see FIG. 4). Furthermore, the lateral edges of the plate portion diverge in the downward direction (see FIG. 3.), thus making the plate portion generally wedge-shaped, as viewed in front and rear elevation. The wedge shapes of both the lateral and frontal aspects of the plate portion facilitate reception of the complimentarily wedge-shaped cavity (described below) formed by the attachment sleeve 18 and permits firm seating of the attachment sleeve 18 on the plate portion 22 through a wedging action.

In between the upstanding legs of the wall portion 22a is a leaf portion 26 that is formed integrally with the bracket 10 and remains attached along its lower edge but is defined by a pair of parallel, vertical, laterally spaced-apart slots 28. About a quarter of the way down from the upper edge of the leaf 26 is a downwardly facing shoulder 26a forming a latch portion of the leaf. An inclined surface 26b on the back face of the leaf above the shoulder 26a is a camming surface and provides for deflection of the leaf, as described in detail below. The lateral edges of the upper portion of the leaf above the shoulder 26a are beveled, such surfaces being designated by the reference numerals 26c (See FIG. 2).

An upper opening 28 extends through the upper portion of each leg 24 of the bracket 10, each such opening 28 beginning at a front recess 30 that is larger than the opening 28 and ending at a juncture 30a with the upper surface of the arm. As shown in FIG. 5, one end of a band clamp 32 is bent back on itself and spot-welded or otherwise suitably attached to form a loop. A retainer bar 34 is installed in the loop and is received in the recess 30 in each of the respective arms 24. The band clamp wraps around the handlebar H, and the remaining end is bent back on itself and spot-welded to form a loop that receives a barrel nut 36. A screw 38 is threaded into the barrel nut, the screw being received in a recess 40 in the front face of the bracket and passing through a hole 43 that opens into a recess 44 on the underside of the arm. Upon tightening of the screw 38, the band clamp is drawn tightly around the handlebar H, thereby frictionally clamping the respective arm to the handlebar. To enhance the frictional force between the ends of the arms 24 and the handlebars, metal (preferably, aluminum) spacers 41 are clamped between the arms and the handlebars. Inasmuch as handlebars come in different diameters in different makes and models of bicycles, it is desirable to supply two or three different sized spacers 41 so that the user can choose the one that best fits the size of the handlebars of his or her bicycle. The spacer has a locating rib 42. The back, free end of each arm is shaped to match the front surface and rib 42 of the spacer. It will be observed that the band clamp 32, together with the screw 38, extend in a U-shaped loop from two points adjacent the plate portion of the bracket and around the handlebar. Accordingly, the metal components of the attachment assembly impart strength to the arm, and the arm is loaded mainly in compression. Furthermore, the attachment arrangement is convenient to use, inasmuch as the screws 38 are accessible from in front of the bicycle.

Figure 9:
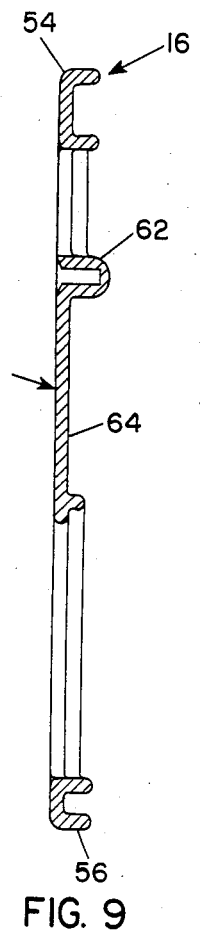
FIG. 9 is a right side cross-sectional view of the frame component of the embodiment taken generally lines 9—9 of FIG. 10.
Figure 10:
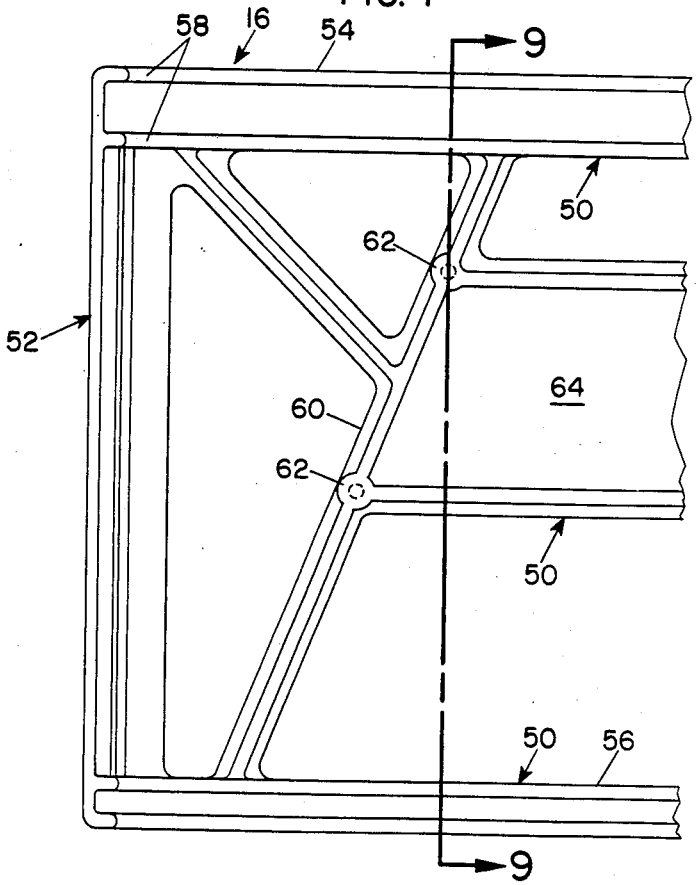
FIG. 10 is a front elevational view of the right portion of the frame, which is also the mirror image of the left portion, inasmuch as the frame is symmetrical about its vertical center plane.

In internal frame 16, as may be best observed in FIGS. 1, 9 and 10, is a network of rib members and is molded as a unitary structure from a suitable plastic material. It comprises a back portion 50 and two side portions 52. The perimeters of the back and side portions are co-extensive with the perimeters of the back and side walls or panels of the fabric bag 14 and are thus substantially coincident with the junctures between the back and side walls and the other walls of the bag that they adjoin. More simply put, the frame 16 has edges that are coincident with the perimeters of three of the six walls of the bag, and, therefore, the internal frame completely defines the shape of the bag. The construction of the frame from a series of rib members keeps it light in weight. The desired strength is obtained by forming each rib member as a channel or T-section, as may be seen in the cutaway portions of FIG. 1 and in FIG. 9. Inasmuch as the drawings adequately illustrate the construction of the frame 16, extensive description is not required. It is worthy of mention, however, that each of the upper and lower main members 54 and 56 of the frame is generally U-shaped in top plan, is channel-shaped in cross section and includes a gusset 58 in each channel flange at the juncture between each side portion 52 and the back portion 50. The gussets 58 impart considerable rigidity to the frame against the lateral bending of each side portion 52 relative to the back portion 50. The frame also includes a pair of rib members 60 extending obliquely between the bottom and top rib members 54 and 56 along paths that provide attachment points for connecting the attachment sleeve 18. A boss 62 is formed on each rib 60 at a location corresponding to each of the four attachment points. The back portion of the frame also includes a web 64 that is coincident with the area of the back wall of the bag engaged by the front of the plate portion 22 of the bracket. The web 64 provides strength and rigidity to help maintain the integrity of the shape of the attachment sleeve 18 and also prevents objects in the bag from deforming the fabric wall of the bag in the region where the bracket is received, lest the objects interfere with acceptance of the bracket in the cavity defined by the attachment sleeve or interfere with release of the latch.

Figure 6:
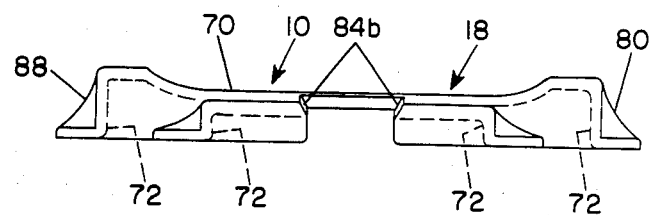
FIGS. 6, 7 and 8 are top plan, front elevational, and left side cross-sectional views, respectively, of the attachment sleeve component of the bracket assembly.
Figure 8:
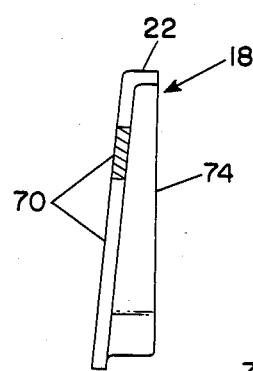
Figure 7:
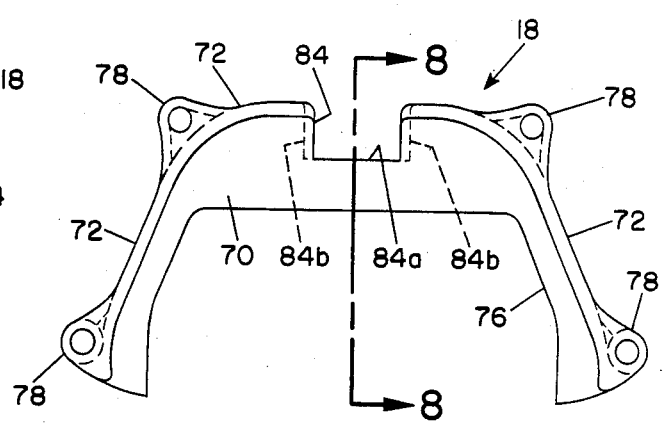

As will be observed in FIGS. 6-8, the attachment sleeve 18 is of inverted generally "U" shape in front elevation (FIG. 7) and has a rear wall 70 bounded at the perimeter by a forwardly extending flange 72, the free edge of which forms a frontal plane designated 74 in FIG. 8. The rear wall 70 has a large cutout 76 through which the arms of the bracket project. Four ears 78 extend out from the free edges of the flanges, each being strengthened by gussets, for example 80, and having a hole for receiving a screw 82 (FIG. 1) that passes through the back panel of the fabric bag 14 and into the corresponding screw boss 62 on the internal frame 16. As so attached to the back portion of the frame 16, the back wall 70 and flange 72 define an inverted, generally U-shaped, downwardly open cavity that is shaped to receive the plate portion of the bracket. A notch 84 in the top of the wall 70 accepts the latch 26 on the bracket, the upwardly facing lower edge 84a of the notch 84 providing a seating surface for the latch shoulder 26a. The side edges 84b of the notch 84 are beveled in correspondence with the beveled side edges 26c of the latch 26a of the bracket. If there is side-to-side or twisting motion of the attachment sleeve relative to the bracket, the correspondingly beveled edges of the latch and the notch engage and slide against each other in such a way as to keep the latch engaged.

To mount the bag on the bracket, the user simply positions the bag so that the attachment sleeve 18 can slide down over the plate portion 22 of the bracket 10. Because of the complementary wedge shapes of the bracket plate and the cavity, the starting position for sliding the attachment sleeve into place on the bracket need only be approximate. When the user moves the bag downwardly, the attachment sleeve is automatically guided into seated relation on the plate portion of the bracket. When the cam surface 26b of the latch on the bracket encounters the lower edge of the attachment sleeve below the notch 84 the bracket latch is cammed forwardly, and upon clearing the edge 84a of the notch, the bracket resiles into latched position with the shoulder 28a in engagement with the edge 84a. To dismount the bag from the bracket, the user need merely press forward on the latch 26 and lift the bag up.

When the bag is mounted on the bracket the cavity defined by the attachment sleeve receives substantially immovably the plate portion of the bracket. Inasmuch as the attachment sleeve is rigidly attached to the internal frame 16 of the bag and the bracket is immovably attached to the handlebars, the bag, of course, is immovably attached to the handle bars. The frame 16 provides a very high degree of rigidity in both shaping the bag and preventing lateral deflection of the bag and its contents.

Thus, there is provided in accordance with the present invention, a carrier bag for bicycle handlebars that minimizes side sway of the bag and its contents, provides excellent support with load distribution through the bag walls for the contents of the bag, is easy to install on the bicycle and is convenient to use. When the bag is removed from the mounting bracket, the only component of the attachment system that goes with the bag is the relatively light-weight and unobtrusive attachment bracket. There are no cables or other accoutrements of the system to be detached and put away. The frame and attachment system leave the top part of the bag available as the top closure, which, though conventional, is highly desirable because of the convenience.

I claim:

1. A handlebar carrier bag assembly for bicycles comprising a bracket having a generally vertical plate portion and a pair of generally horizontal support arms extending from the back of the plate portion, means for fastening an end of each of said arms of the bracket immovably to bicycle handlebars, a bag of durable flexible material having front and back walls, side walls and a bottom wall permanently joined to each other and a top wall permanently joined to one of the front, back and side walls and adapted to be releasably joined to the others of the front, back and side walls, a substantially rigid unitary three-dimensional frame received within the bag and including a back portion having a perimeter substantially co-extensive with the perimeter of the back wall of the bag and side portions having perimeters substantially co-extensive with the perimeters of the respective side walls of the bag, a substantially rigid attachment sleeve affixed to the back portion of the frame externally of the bag and defining with a part of said frame back portion a downwardly open cavity that releasably receives from below in close-fitting relation the plate portion of the bracket, whereby the frame is mounted substantially immovably against downward and lateral movement on bicycle handlebars.

2. A handlebar bag according to claim 1 wherein the plate portion of the bracket has side edges that diverge downwardly, whereby mounting of the bag on the bracket is facilitated and the attachment sleeve can firmly seat on the bracket plate portion by a wedging action.

3. A handlebar bag according to claim 1 or claim 2 wherein the plate portion has front and back surfaces that diverge downwardly relative to each other, and the attachment sleeve is shaped for conformity with said back surface, whereby the cavity is upwardly tapered to facilitate mounting the bag on the bracket and for firm seating of the attachment sleeve on the bracket plate portion by wedging action.

4. A handlebar bag according to claim 1 and further comprising means for releasably affixing the attachment sleeve to the bracket against upward movement.

5. A handlebar bag according to claim 3 wherein the affixing means includes a latch member on the bracket having a downwardly facing latch shoulder and an upwardly facing abutment surface on the attachment sleeve engageable by the latch shoulder when the bag is mounted on the bracket, the latch member being resiliently biased for engagement of the shoulder with the abutment and movable against the bias for release.

6. A handlebar bag according to claim 5 wherein the latch member is an integral part of the plate portion of the bracket defined by generally vertical laterally spaced-apart elongated slots in the plate portions defining a leaf having a free upper end, the shoulder being on the back of the leaf near the upper end.

7. A handlebar bag according to claim 6 wherein the upper end of the leaf is substantially contiguous with the upper edge of the plate portion and wherein the abutment is the bottom edge of an upwardly open notch in the attachment sleeve.

8. A handlebar bag according to claim 1 wherein the cavity is of inverted U-shape and has an opening in the back through which the support arms of the bracket protrude when the bag is mounted on the bracket.

9. A handlebar bag according to claim 1 wherein the frame is molded from a polymeric material and includes a network of interconnected rib members.

10. A handlebar bag according to claim 9 wherein the rib members include an upper rib member and a lower rib member, each of generally U-shape in plan and constituting the respective upper and lower perimeters of the back and side portions of the frame.

11. A handlebar bag according to claim 10 wherein the back and side portions of said upper and lower rib members are joined by gussets for enhanced rigidity against deflection of the side portions of the frame.

12. A handlebar bag according to claim 9 wherein the back portion of the frame includes back rib members coincident with four mutually spaced-apart portions of the attachment sleeve and the sleeve is attached to the back rib members at said four portions.

13. A handelbar bag according to claim 1 wherein the means for connecting the bracket to bicycle handlebars comprises a metal band associated with each bracket arm and means for tensioning the band in a loop around bicycle handlebars to draw the end of each arm into clamped frictional engagement with bicycle handlebars.

14. A handlebar bag according to claim 13 wherein one end of each band passes through the plate portion of the bracket and is affixed thereto against movement toward the free end of the arm, the other end of each arm receives a nut, and a screw passes through the plate portion from the front and is threaded into the nut, whereby the nuts are conveniently accessible for tightening from the front of the plate portion and metal components form loops beginning and ending at the front of the bracket plate portion for enhanced strength and compression loading of the bracket arms.

* * * * *